(12) United States Patent
Shovels et al.

(10) Patent No.: US 8,635,854 B2
(45) Date of Patent: Jan. 28, 2014

(54) REDUCTANT INJECTION CONTROL SYSTEM

(75) Inventors: Michael L. Shovels, Jackson, MI (US); Ryan A. Floyd, Mason, MI (US); James J. Reynolds, III, Ypsilanti, MI (US); Joseph G. Ralph, Owosso, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 252 days.

(21) Appl. No.: 13/198,952

(22) Filed: Aug. 5, 2011

(65) Prior Publication Data
US 2013/0031890 A1 Feb. 7, 2013

(51) Int. Cl.
*F01N 3/00* (2006.01)

(52) U.S. Cl.
USPC .............................. 60/287; 60/274

(58) Field of Classification Search
USPC ............... 60/274, 286, 287, 295, 298, 303
See application file for complete search history.

(56) References Cited

U.S. PATENT DOCUMENTS

| | | | |
|---|---|---|---|
| 6,691,508 B2 | 2/2004 | Sato et al. | |
| 6,941,746 B2 | 9/2005 | Tarabulski et al. | |
| 7,178,328 B2 | 2/2007 | Solbrig | |
| 7,410,615 B2 | 8/2008 | Krug et al. | |
| 7,497,076 B2 | 3/2009 | Funk et al. | |
| 7,726,118 B2 | 6/2010 | Oberski et al. | |
| 8,024,922 B2 | 9/2011 | Van Vuuren et al. | |
| 2005/0235632 A1* | 10/2005 | Tarabulski et al. | 60/282 |
| 2005/0282285 A1 | 12/2005 | Radhamohan et al. | |
| 2007/0006571 A1* | 1/2007 | Vetrovec | 60/281 |
| 2008/0022654 A1 | 1/2008 | Broderick et al. | |
| 2008/0087008 A1 | 4/2008 | Reba et al. | |
| 2009/0113877 A1 | 5/2009 | Van Nieuwstadt | |
| 2009/0217644 A1 | 9/2009 | Jung | |
| 2009/0255232 A1* | 10/2009 | Barcin | 60/274 |
| 2009/0301068 A1* | 12/2009 | Fujita et al. | 60/286 |
| 2010/0107615 A1* | 5/2010 | Chmielewski et al. | 60/303 |
| 2010/0154385 A1* | 6/2010 | Perrin et al. | 60/274 |
| 2011/0061364 A1* | 3/2011 | Raman | 60/274 |
| 2011/0083424 A1 | 4/2011 | Wang et al. | |
| 2011/0107742 A1 | 5/2011 | Igarashi et al. | |

FOREIGN PATENT DOCUMENTS

| | | |
|---|---|---|
| JP | 2008-163856 | 7/2008 |
| JP | 2008169711 A * | 7/2008 |
| JP | 4748664 | 8/2011 |

\* cited by examiner

*Primary Examiner* — Thomas Denion
*Assistant Examiner* — Mickey France
(74) *Attorney, Agent, or Firm* — Harness, Dickey & Pierce, P.L.C.

(57) ABSTRACT

A control system for reducing nitrogen oxides in an engine exhaust of an engine includes an emissions catalyst having an inlet adapted to receive an exhaust from the engine. A reductant tank stores a reductant. An injector is in fluid communication with the reductant tank and is operable to inject the reductant into the exhaust upstream of the catalyst. A reductant pump pumps the reductant from the reductant tank to the injector. A controller determines a target pressure of the reductant based on an engine operating condition and operates the reductant pump based on the target pressure.

19 Claims, 3 Drawing Sheets

REDUCTANT INJECTION CONTROL SYSTEM

FIELD

The present disclosure relates generally to exhaust treatment systems and, more particularly, relates to a control system in an exhaust treatment system and related method for controlling a reductant pump in the exhaust treatment system.

BACKGROUND

Selective catalytic reduction technology has been used in conjunction with reducing nitrogen oxides present in the exhaust of internal combustion engines. Many vehicles utilizing internal combustion engines as a prime mover are also equipped with exhaust after-treatment devices for reducing nitrogen oxide emissions. Some of these systems are constructed using a separate container mounted to the vehicle for storing the reductant, a reductant injector and a selective catalytic reduction catalyst. Those systems typically incorporate a reductant pump that delivers the reductant from the container to the injector. While these systems may have performed well in the past, it may be desirable to provide a selective catalytic reduction system that more effectively controls the reductant pump to minimize pump noise and manage actuator cool down relative to exhaust gas temperature.

SUMMARY

This section provides a general summary of the disclosure, and is not a comprehensive disclosure of its full scope or all its features.

A control system for reducing nitrogen oxides in an engine exhaust of an engine includes an emissions catalyst having an inlet adapted to receive an exhaust from the engine. A reductant tank stores a reductant. An injector is in fluid communication with the reductant tank and is operable to inject the reductant into the exhaust upstream of the catalyst. A reductant pump pumps the reductant from the reductant tank to the injector. A controller determines a target pressure of the reductant based on an engine operating condition and operates the reductant pump based on the target pressure.

According to other features, the engine operating condition includes an "on" and an "off" status of the engine. The target pressure includes a first target pressure for an engine operating condition of "on" and a second target pressure for an engine operating condition of "off". The second pressure is less than the first pressure. The first target pressure can be 5.5 Bar. The second target pressure can be 2.0 Bar. The target pressures may be calibrated as required. As such, the target pressures discussed are merely exemplary. The control system can further comprise a temperature sensor that is in fluid communication with the engine exhaust and that communicates a temperature signal to the controller. The controller determines the target pressure based on the temperature signal. The controller operates the reductant pump based on the temperature signal.

According to other features, the controller operates the reductant pump for a predetermined time subsequent to the engine being "off" and the temperature signal being greater than a threshold. The predetermined time may be adjusted based on at least one of an ambient temperature, an ambient humidity, and an ambient pressure.

A method for reducing nitrogen oxides in an exhaust stream of an engine with a reductant comprises determining an operating condition of the engine including one of "off" and "on". A target reductant pressure is set to one of a first pressure and a second pressure based on the operating condition of the engine, the second pressure being less than the first pressure. A cool down mode is set based on a temperature of the exhaust stream being greater than a predetermined threshold temperature. The reductant pump is operated to supply the second pressure based on the operating condition of the engine being "off" and the cool down mode being set.

Another method for reducing nitrogen oxides in an exhaust stream of an engine with a reductant comprises determining a first temperature of the exhaust stream. A target reductant pressure is set to one of a first pressure and a second lower pressure based on a comparison of the first temperature to a predetermined injector enabling threshold temperature. An operating condition of the engine is determined including one of "off" and "on". A reductant pump is operated to supply one of the first pressure and the second pressure to an injector when the operating condition is "on". The target reductant pressure is set to the second pressure when the operating condition of the engine is "off". A second temperature of the exhaust system is determined and a cool down time is based on the second temperature. The reductant pump is operated for the cool down time based on the second temperature being greater than a threshold and the operating condition being "off."

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
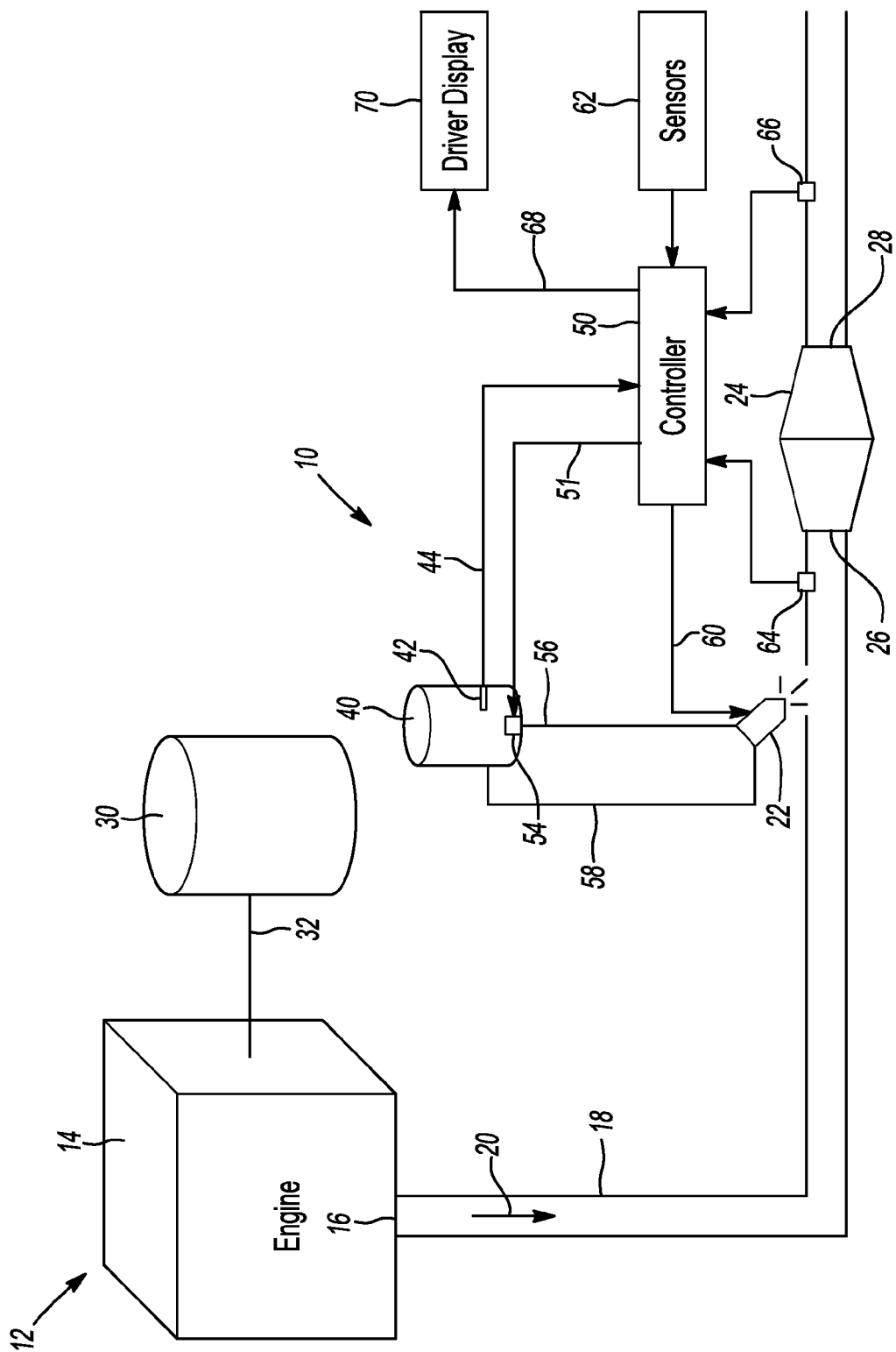
FIG. 1 is a schematic view of an emissions system for reducing nitrogen oxides in an engine exhaust on a vehicle.

FIG. 1 depicts an emissions control system 10 associated with an exemplary vehicle 12. The vehicle 12 includes an engine 14 arranged as a prime mover and having an exhaust port 16 that is in fluid communication with an exhaust conduit 18. An engine exhaust stream 20 flows from the engine 14 through the exhaust conduit 18. An injector 22 is positioned to inject a reductant into the exhaust stream 20 flowing through the exhaust conduit 18. An emissions catalyst 24 having an inlet 26 and an outlet 28 is positioned downstream of the injector 22 and is in receipt of the exhaust stream 20 that is flowing through the exhaust conduit 18.

A fuel tank 30 is mounted to the vehicle 12 to store fuel. The fuel tank 30 is in fluid communication with the engine 14 via a fuel supply line 32 such that fuel may be selectively supplied to combustion chambers of the engine 14. It is contemplated that the engine 14 may be a gasoline fueled spark ignition engine or may be a diesel fueled compression engine. Fuels for the gasoline engine may include gasoline, E85, E95 or other similar fuels. Fuels for the diesel engine may include diesel fuel, bio fuel B5, B10, B20 or other similar fuels. A supplemental reductant tank 40 is also mounted to the vehicle 12. It is contemplated that the tank 40 may store a readily available reductant such as DEF (aqueous urea), E85, E95, B5, B10, B20 or the like. In one example, a user can fill the tank 40 by conventional methods such as by dispensing reductant through a filler neck (not specifically shown) that fluidly connects with the fill tank 40. A reductant level sensor 42 is provided in the reductant tank 40 and communicates a reductant volume signal 44 to a controller 50. The controller 50 communicates a reductant pump signal 51 to a reductant pump 54. The reductant pump 54 delivers the reductant through a reductant line 56 to the injector 22. In this regard, the reductant line 56 is configured to fluidly communicate the reductant from the reductant tank 40 to the injector 22 as will be described herein. A recirculation line 58 may be used to recirculate the reductant such as during a cool down event. The recirculation line 58 can also allow high injection pressures and/or maintain reductant flow.

The controller 50 can be any module and/or device including an application specific integrated circuit (ASIC), an electronic circuit, a processor (shared, dedicated, or group) and memory that execute one or more software or firmware programs, a combinational logic circuit, or other suitable components that provide the described functionality. The controller 50 can communicate a dosing rate signal 60 to the injector 22 based a desired reductant dosing rate.

A plurality of supplemental sensors 62 may be in communication with the controller 50. The sensors 62 may provide signals indicative of, but not limited to, engine speed, ambient air temperature, engine operating temperature, mass air flow, diesel fuel volume within tank 30, NOx concentration, HC concentration, O2 concentration, H2 concentration, ammonia concentration and other data that may be available from a CAN bus or dedicated sensors mounted to the vehicle 12. Exhaust gas temperature sensors 64 and 66 can be positioned in the exhaust conduit 18 and be configured to communicate an exhaust gas temperature (EGT) to the controller 50. In the example provided, the EGT of the sensors 64 and 66 can be averaged. In other examples, only one exhaust gas temperature sensor may be provided.

The controller 50 communicates the reductant pump signal 51 to the reductant pump 54 and the dosing rate signal 60 to selectively operate the injector 22. The controller 50 can also communicate with the injector 22 and the reductant pump 54 to initiate and stop recirculation of reductant through the recirculation line 58. The injector 22 supplies the reductant flowing through the reductant line 56 and recirculation line 58 based on the input provided from the sensors 62, 64, and 66. The controller 50 communicates a status signal 68 to a driver information display 70. The status signal 68 can correspond to various information determined by the controller 50 such as, but not limited to, a fault with the emissions control system 10, an indication of a reductant cool down event, a dosing rate of the injector 22, and a reductant level of the reductant tank 40 or other information related to the emissions control system 10. It is also contemplated that the status signal 68 can also be communicated in conjunction with the emissions control system being disabled by the controller 50.

Figure 2:
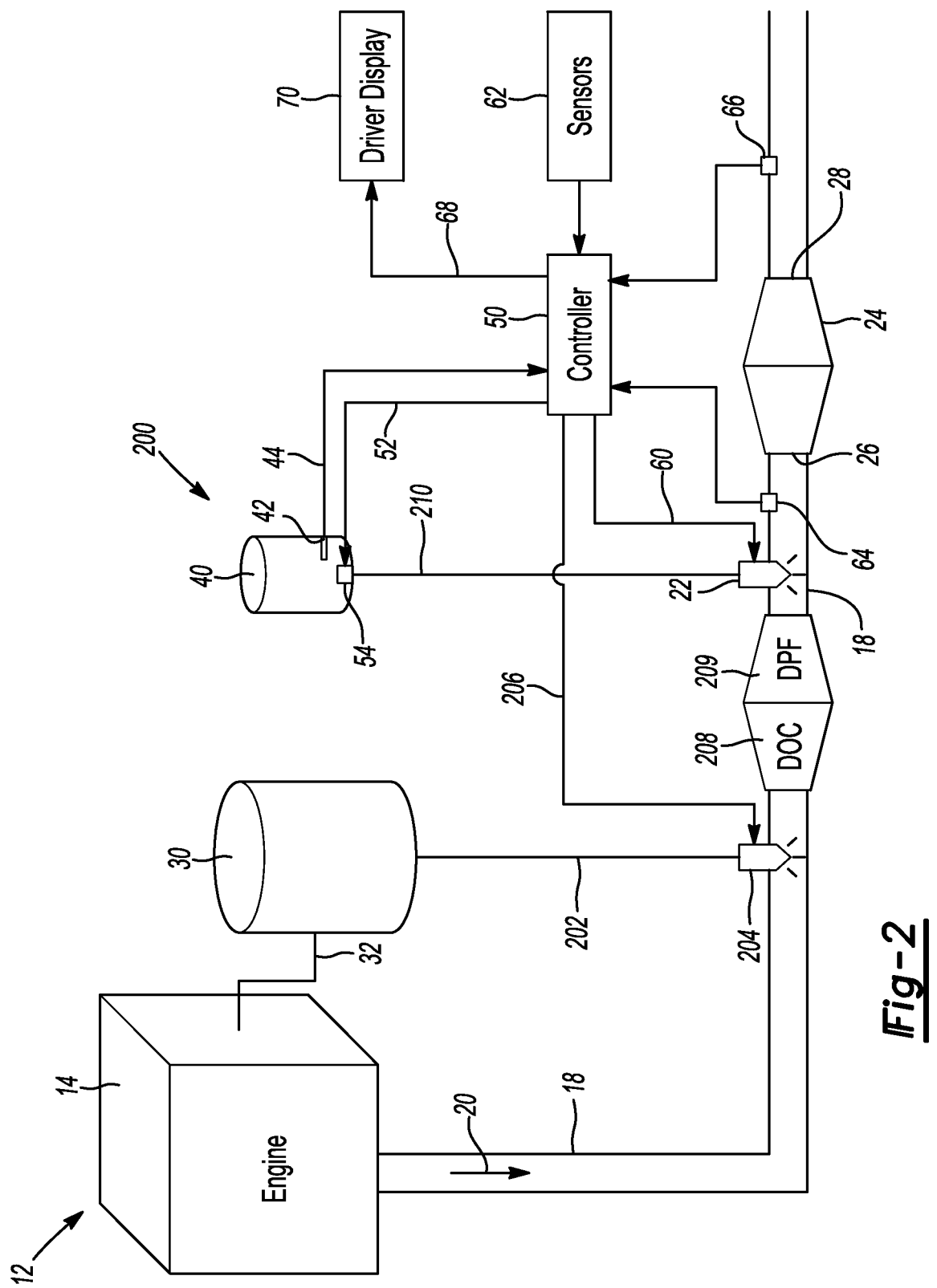
FIG. 2 is a schematic view of an emissions system according to additional features that incorporates multiple reductants and having two distinct reductant delivery lines.

FIG. 2 depicts an alternate emissions control system 200. The emissions control system 200 is similar to the emissions control system 10. Accordingly, like elements will retain their previously introduced reference numerals. In the configuration shown in FIG. 2, a fuel supply line 202 interconnects the fuel tank 30 and a fuel injector 204. The fuel injector 204 is operable to selectively supply fuel as a reductant to the engine exhaust stream 20 in the exhaust conduit 18. The supply of fuel into the exhaust stream 20 is controlled by way of a fuel signal 206 communicated by the controller 50. A diesel oxidation catalyst (DOC) 208 and a diesel particulate filter (DPF) 209 are positioned in receipt of the exhaust flowing through conduit 18 downstream of the fuel injector 204.

Another supply line 210 interconnects the reductant tank 40 with the injector 22. The injector 22 is selectively operable to inject the reductant (for example, DEF) contained within the reductant tank 40 into the exhaust stream 20 passing through the exhaust conduit 18 as described above with respect to the control system 10. It will be understood that the control systems 10 and 200 are merely exemplary and the method described below may be applied to other control systems.

Figure 3:
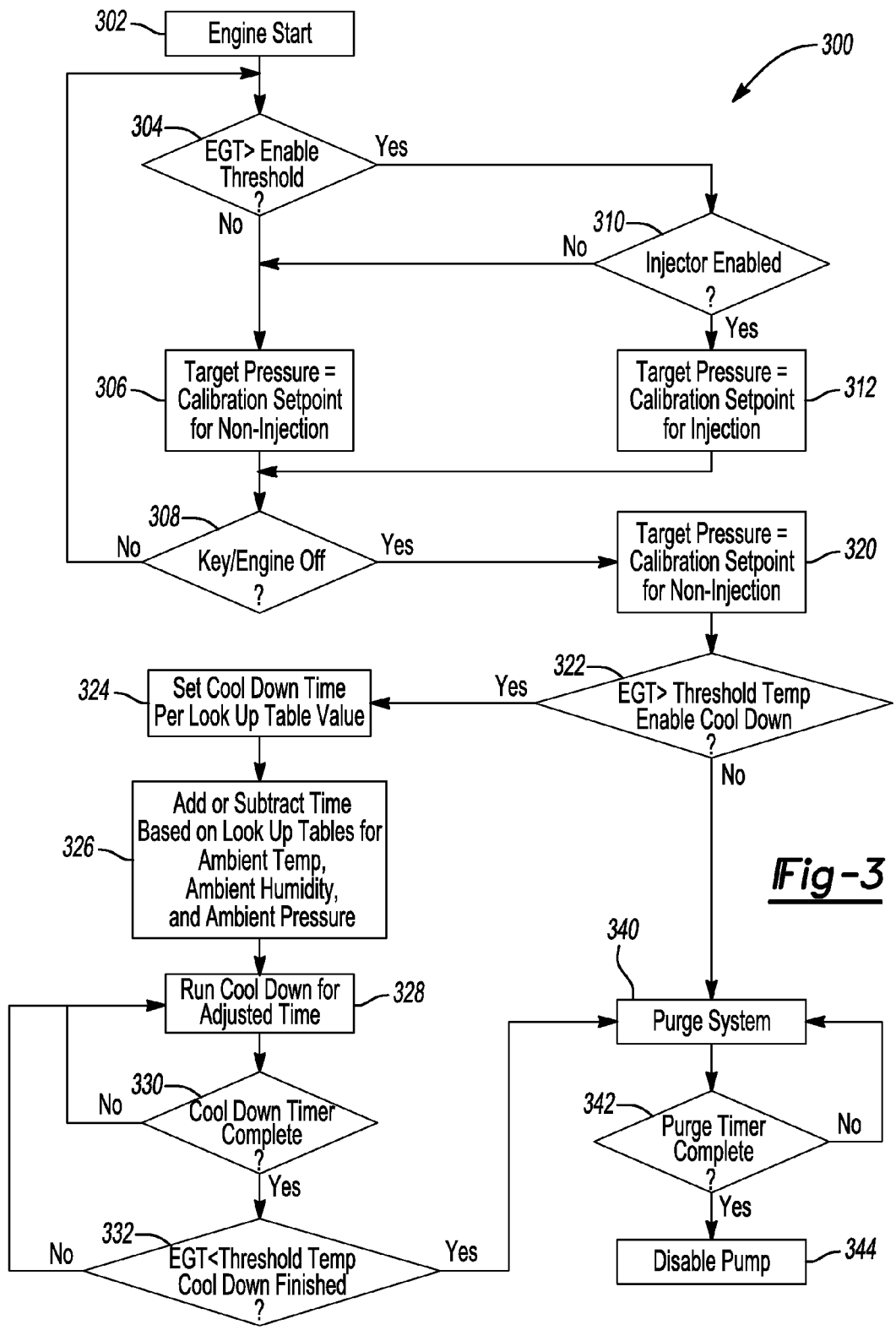
FIG. 3 is a functional block diagram of a control system that controls a pump of the emissions system of the present disclosure.

With reference now to FIG. 3, a method for reducing nitrogen oxides in an exhaust stream of an engine with a reductant is shown and generally identified at reference numeral 300. The engine 14 starts in step 302. In step 304, control determines if an exhaust gas temperature (EGT) is greater than an enable threshold. The EGT can be determined such as by the temperature sensors 64 and 66 communicating temperature signals to the controller 50. According to one example, the enable threshold can be a calibrated value of degrees Celsius such as, but not limited to, 200 degrees Celsius. If the EGT is not greater than an enable threshold, control sets a target pressure equal to a calibration set point for non-injection in step 306. In one example, the target pressure can be a set point for closed loop pressure control.

The pump 54 can be controlled by the controller 50 to a speed that is based on a pressure of the reductant such as in the reductant lines 56 and/or 58. A pressure value can be provided by a pressure sensor of the sensors 62. The calibration set point for non-injection according to one example can be 2.0 Bar. Other values may be used. In step 308, control determines if a user has turned the engine 14 "off". If not, control loops to step 304. If the user has turned the engine "off" in step 308, control proceeds to step 320. It will be appreciated that the terms "off" and "on" are used herein to denote an operating condition of the engine 14. In other words, the term "off" is used to denote an engine 14 that is not firing or otherwise inactive. Likewise, the term "on" is used to denote an engine 14 that is firing or otherwise active.

Returning now to step 304, if the EGT is greater than an enable threshold, control determines if the injector 22 is enabled in step 310. If the injector 22 is not enabled in step 310, control proceeds to step 306. If the injector 22 has been enabled in step 310, control proceeds to step 312. In step 312, control sets a target pressure equal to a calibration set point for injection. In one example, the calibration set point can be 5.5 Bar. Again, while this value is almost three times the set point for non-injection, this value is merely exemplary. It will be understood, however, that the target pressure for injection is greater than the target pressure for non-injection (step 306). Control then proceeds to step 308.

If engine is "off", control proceeds to step 320. In step 320, control sets the target pressure equal to the calibration set point for non-injection. In this regard, if the user has turned the engine 14 "off", control then can operate the pump 54 at a reduced speed corresponding to the reduced pressure. As a result, the audible noise observed by a vehicle occupant from the pump 54 is reduced when the engine 14 is "off".

In step 322, control determines if the EGT is greater than a threshold temperature to enable cool down. In one example, cool down can include recirculating the reductant such as through the fluid lines 56 and 58 to reduce the temperature of injector 22. The threshold temperature can be a determined value corresponding to a temperature that is cool enough such that the injector 22 does not overheat. In one example, the threshold temperature can be reached after recirculation of the reductant (such as through line 58) is stopped. If control determines that the EGT is greater than the threshold temperature in step 322, control sets a cool down time according to a lookup table in step 324. In step 326, the cool down time can be modified based on one or many lookup tables. The one or many lookup tables can determine an adjusted cool down time based on the initially determined cool down time and at least one of an ambient temperature, an ambient humidity, and an ambient pressure. Time is added or subtracted to the initially determined cool down time to obtain the adjusted cool down time. These values of ambient temperature, ambient humidity, and ambient pressure can be provided by the sensors 62. In step 328, control runs cool down for the adjusted cool down time.

In step 330, control determines if the cool down time has completed. As can be appreciated, the cool down time can be set to any value, for example, six minutes. As can be appreciated, however, the cool down timer will vary based upon the value determined in step 326. If the cool down timer has not completed in step 330, control loops to step 328. If the cool down timer has completed in step 330, control proceeds to step 332. In step 332, control determines if the EGT is less than the threshold temperature and cool down has finished. If the EGT is not less than the threshold temperature, control loops to step 328. If the EGT is less than the threshold temperature, control proceeds to step 340. In step 340, the system is purged. In one example, the system can be purged by operating the pump 54 in reverse. In step 342, control determines if a purge timer is complete. The calibrated value can be any value, such as 120 seconds. If the timer has not been completed in step 342, control loops to step 340. If the timer has been completed in step 342, the pump 54 is disabled in step 344.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control system for reducing nitrogen oxides in an engine exhaust of an engine, the control system comprising:
    an emissions catalyst having an inlet adapted to receive an exhaust from the engine;
    a reductant tank that stores a reductant;
    an injector in fluid communication with the reductant tank and operable to inject the reductant into the exhaust upstream of the catalyst;
    a reductant pump that pumps the reductant from the reductant tank to the injector; and
    a controller that determines a target pressure of the reductant based on an engine operating condition and operates the reductant pump to supply the target pressure, wherein the engine operating condition comprise an "on" and "off" status of the engine, and further wherein the target pressure comprises a first target pressure for an engine operating condition of "on" and a second target pressure for an engine operating condition of "off", wherein the second target pressure is less than the first target pressure and greater than zero.

2. The control system of claim 1, wherein the first target pressure is substantially about 5.5 Bar and the second target pressure is substantially about 2.0 Bar.

3. The control system of claim 1, wherein the engine operating condition includes an engine exhaust temperature.

4. The control system of claim 3, wherein the controller operates the reductant pump based on the exhaust temperature.

5. The control system of claim 4, wherein the controller determines a cool down time based on the exhaust temperature.

6. The control system of claim 5, wherein the controller operates the reductant pump for the cool down time subsequent to the engine being "off" and the exhaust temperature being greater than a threshold.

7. The control system of claim 6, wherein the cool down time is adjusted based on at least one of an ambient temperature, ambient humidity and ambient pressure.

8. A method for reducing nitrogen oxides in an exhaust stream of an engine with a reductant, the method comprising:
    determining an operating condition of the engine including one of "off" and "on";
    setting a target pressure of the reductant to one of a first pressure and a second pressure based on the operating condition of the engine, the second pressure being less than the first pressure;
    determining a temperature of the exhaust stream;
    setting a cool down mode based on the temperature being greater than a predetermined threshold temperature; and
    operating the reductant pump to supply the second pressure based on the operating condition of the engine being "off" and the cool down mode being set.

9. The method of claim 8, wherein determining the temperature of the exhaust stream comprises:
    communicating a temperature signal from a temperature sensor disposed for fluid communication in the exhaust stream.

10. The method of claim 9, further comprising:
    determining a cool down time based on the temperature; and
    operating the reductant pump for the cool down time subsequent to the engine being "off" and the temperature signal being greater than a threshold.

11. The method of claim 10, wherein the cool down time is adjusted based on an ambient temperature.

12. The method of claim 10, wherein the cool down time is adjusted based on an ambient humidity.

13. The method of claim 10, wherein the cool down time is adjusted based on an ambient pressure.

14. The method of claim 10, wherein operating the reductant pump includes recirculating the reductant through the injector.

15. The method of claim 14, further comprising purging the reductant away from the injector.

16. The method of claim 15, wherein purging comprises:
    operating the reductant pump in a reverse direction.

17. A method for reducing nitrogen oxides in an exhaust stream of an engine with a reductant, the method comprising:
    determining a first temperature of the exhaust stream;
    setting a target pressure of the reductant to one of a first pressure and a second lower pressure based on a comparison of the first temperature to a predetermined injector enabling threshold temperature;

determining an operating condition of the engine including one of "off" and "on";

operating a reductant pump to supply one of the first pressure and the second pressure to an injector when the operating condition is "on";

setting the target pressure of the reductant to the second pressure when the operating condition of the engine is "off";

determining a second temperature of the exhaust system;

determining a cool down time based on the second temperature; and operating the reductant pump for the cool down time based on the second temperature being greater than a threshold and the operating condition being "off".

18. The method of claim 17, further including adjusting the cool down time based on at least one of an ambient temperature, an ambient humidity and an ambient pressure.

19. The method of claim 17, wherein the second lower target pressure is set when the first temperature does not exceed the injector enabling threshold temperature.

\* \* \* \* \*